United States Patent
Das et al.

(10) Patent No.: US 7,564,822 B2
(45) Date of Patent: Jul. 21, 2009

(54) METHOD OF REVERSE LINK TRANSMISSION IN A WIRELESS NETWORK USING CODE AND FREQUENCY MULTIPLEXING

(75) Inventors: Suman Das, Scotch Plains, NJ (US); Pantelis Monogioudis, Randolph, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 408 days.

(21) Appl. No.: 11/133,100

(22) Filed: May 19, 2005

(65) Prior Publication Data

US 2006/0268786 A1 Nov. 30, 2006

(51) Int. Cl.
*H04B 7/216* (2006.01)
(52) U.S. Cl. .................. 370/335; 370/342; 370/344
(58) Field of Classification Search ................. 370/310, 370/318, 329, 331, 335, 338, 203, 342, 208, 370/252, 374, 352, 465, 468, 353, 204, 265; 455/67.11, 450, 436, 452, 453; 375/260
See application file for complete search history.

(56) References Cited

U.S. PATENT DOCUMENTS

| | | | | |
|---|---|---|---|---|
| 7,047,006 | B2* | 5/2006 | Classon et al. ............... | 455/434 |
| 2002/0159395 | A1* | 10/2002 | Nelson et al. ............... | 370/252 |
| 2003/0086366 | A1* | 5/2003 | Branlund et al. ............ | 370/208 |
| 2003/0193907 | A1* | 10/2003 | Rezaiifar et al. ............ | 370/329 |
| 2004/0141481 | A1 | 7/2004 | Lee et al. ..................... | 370/335 |
| 2004/0179469 | A1 | 9/2004 | Attar et al. .................. | 370/208 |
| 2006/0193391 | A1* | 8/2006 | Borran et al. ............... | 375/260 |

FOREIGN PATENT DOCUMENTS

| | | |
|---|---|---|
| DE | 198 45 057 | 4/2000 |
| EP | 1 388 954 | 2/2004 |
| EP | 1 526 674 | 4/2005 |
| WO | WO 02/49305 | 6/2002 |
| WO | WO 03/105381 | 12/2003 |

OTHER PUBLICATIONS

Notification of Transmittal, 2 pages.
International Search Report, PCT/US2006/017463, (May 5, 2006), 6 pages.
"Written Opinion of the International Searching Authority," PCT/US2006/017463, 8 pages.
Christopher Lott, "Enhanced Rimac for 1xEV-DO," *QUALCOMM Incorporated*, 858-651-4393, clott@qualcomm.com, (Apr. 14, 2003), pp. 1-36.
Roger B. Marks, et al, "Part 16: Air Interface for Fixed and Mobile Broadband Wireless Access Systems-Amendment for Physical and Medium Access Control Layers for Combined Fixed and Mobile Operation in Licensed Bands," Draft IEEE Standard for Local and metropolitan area networks, *IEEE P802.16e/D6*, (Feb. 18, 2005), pp. 1-460.

* cited by examiner

*Primary Examiner*—Jean A Gelin
(74) *Attorney, Agent, or Firm*—John Ligon; Martin I. Finston

(57) ABSTRACT

A hybrid method of reverse link transmission provides improved performance, particularly in wireless packet data systems. The method includes aspects of both OFDMA transmission and MC-CDMA (Multi-carrier CDMA) transmission. In specific embodiments, an MC-CDMA pilot signal is used, and the data portion of the timeslot is partitioned between an MC-CDMA field and an OFDMA field.

6 Claims, 1 Drawing Sheet

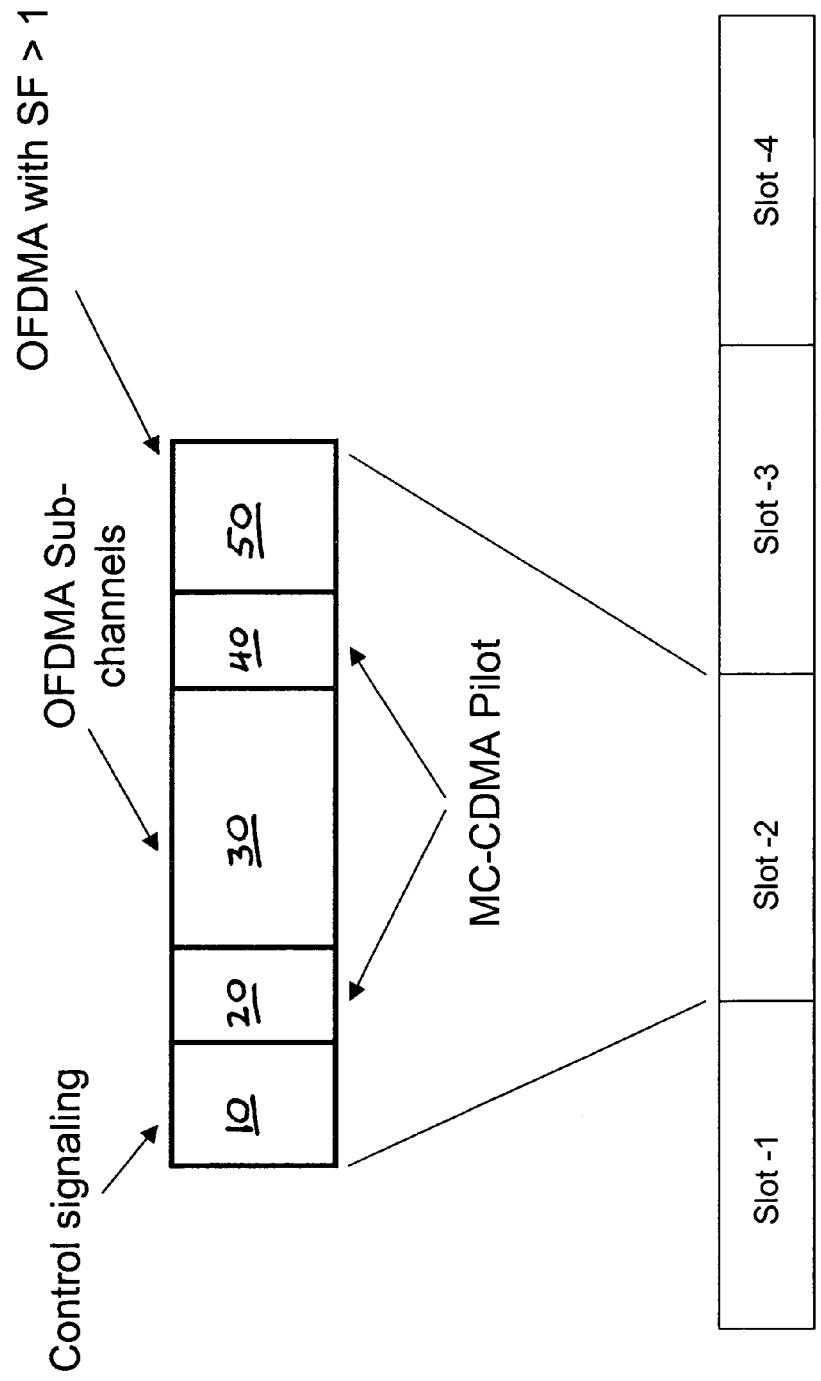

METHOD OF REVERSE LINK TRANSMISSION IN A WIRELESS NETWORK USING CODE AND FREQUENCY MULTIPLEXING

FIELD OF THE INVENTION

This invention relates to wireless networks, and more particularly to reverse link transmission formats in wireless networks for communicating packet data.

ART BACKGROUND

Various types of wireless network are known that are able to communicate packet data. In CDMA technology, for example, such systems include EV-DO Rev. 0 and EV-DO Rev. 1. In general, reverse link access in CDMA systems is achieved by having users modulate their pilot and information signals on individually assigned spreading codes. Pilot and other control signals are code-multiplexed with data. In general, each user transmits a pilot signal in every timeslot.

In OFDMA technology, there are also wireless networks that can communicate packet data. Such networks include, for example, those that conform to the IEEE 802.16 standard. In general, OFDMA systems divide the total bandwidth available for reverse link transmission into narrow subcarriers. Groups of subcarriers collectively compose subchannels. In a given timeslot, each user may be allocated one or more subchannels which are orthogonal to each other and to subchannels allocated to other users. Subchannel allocations may change from one timeslot to the next. Each user transmits in bursts in those timeslots in which subchannels have been allocated to it. Certain subcarriers are allocated specifically for pilot signals. Each user transmits pilot signals in the pilot sub-carriers of the sub-channels assigned for data transmission.

Both the CDMA technology and the OFDMA technology suffer certain drawbacks. For example, interference between users tends to be relatively high in CDMA systems, and therefore might limit the total transmission rate on the reverse link. In OFDMA systems, on the other hand, a significant amount of signaling overhead is needed to support the assignment of subchannels. This limits the resources available for reverse link data transmission. In both technologies, users near the cell edge, which in general must transmit with relatively high power, tend to interfere with neighboring cells.

Thus, there remains a need for wireless systems, and in particular for wireless packet data systems, with still better reverse link performance.

SUMMARY OF THE INVENTION

We have developed a hybrid method of reverse link transmission which provides improved performance, particularly in wireless packet data systems. Our method includes aspects of both OFDMA transmission and MC-CDMA (Multi-carrier CDMA) transmission. In MC-CDMA, both OFDMA subcarriers and CDMA spreading codes are used. However, the subcarriers are not grouped into subchannels. Instead, generally speaking, all users occupy all subcarriers. Each user has at least one individually assigned spreading code on which to modulate its signal for reverse link transmission. The MC-CDMA pilot signal occupies a specific portion of a transmission timeslot. The respective pilot signals are code multiplexed.

In one aspect, our method involves a user, within a given timeslot, transmitting an MC-CDMA pilot signal and an OFDMA data signal. In a related aspect, our method involves the base station receiving and processing the MC-CDMA pilot signal and the OFDMA data signal in the given timeslot.

In another aspect, our method involves the user choosing, based on a selection criterion, whether to transmit the data signal in OFDMA format or in MC-CDMA format. Within the given timeslot, the user transmits the MC-CDMA pilot signal and sends the data signal in the chosen format.

In another aspect, our method involves the user specifying at least one desired subchannel width when requesting one or more subchannels from the network for forward link transmission, receiving a subchannel assignment from a set of subchannels having different widths, and making a transmission on the assigned subchannel or subchannels.

In another aspect, our method involves the user determining that two or more subchannels are available to it for making a forward link transmission, grabbing one of said channels in accordance a priority ordering of subchannels, and making the transmission on the grabbed subchannel.

In another aspect, our method involves the base station responding to a user request for a subchannel of a given width by honoring the request if a subchannel of the requested width is available, but granting a subchannel of a different width if the requested width is unavailable.

Other aspects of our new method will become evident from the description that follows.

BRIEF DESCRIPTION OF THE DRAWING

FIG. 1 is a schematic diagram of a timeslot for reverse-link transmission useful in the practice of the invention in an illustrative embodiment.

DETAILED DESCRIPTION

An illustrative timeslot for reverse-link transmission by a user is shown in FIG. 1. Except as described below, the timeslot is structured in frequency and time as an OFDMA timeslot as described, for example, by pertinent standards. As shown in the figure, the total duration of the timeslot is divided into several distinct fields, which are sequential in time. Field 10 is dedicated to control signaling, fields 20 and 40 are for pilot signals, field 30 is for transmitting data in OFDMA format, and field 50 is for transmitting data in MC-CDMA format.

The partition of the pertinent portion of the timeslot between OFDMA field 30 and MC-CDMA field 50 is flexible. That is, the relative durations of these fields can be changed. The partition may be set, for example, by the base station, depending on the kind of service that is being requested, cell size, and possibly other factors. Services may include, among others, high rate streaming, VoIP (Voice Over IP), and gaming. Because the user chooses the data format once per service flow, it is possible to transmit within a given timeslot both in field 30 and in field 50.

For transmission in OFDMA field 30, at least some of the OFDM subcarriers are grouped into distinct, orthogonal subchannels. Without the use of spreading codes, each such subchannel may be occupied by at most one user. With the use of spreading codes, each such subchannel may be occupied by more than one user, provided that all such users employ mutually orthogonal codes. In at least some cases, it will be advantageous for transmissions in OFDMA field 30 to employ frequency hopping in order to reduce out-of-cell interference through averaging effects.

In at least some cases, it will be advantageous to depart from conventional subchannels, which have equal widths, by providing subchannels of varying widths. This is particularly true for cells with users distributed at various distances from the base station. Users situated relatively near the base station can be received with higher power than those near the cell edge because they cause less interference to other cells. Thus, because the bandwidth that can be occupied efficiently tends to increase as transmission power increases, the users closest to the base station can generally be permitted to occupy a larger bandwidth than the users at the cell edge.

For example, a set of 200 subcarriers may be grouped into ten distinct subchannels of the following widths, as measured by the respective number of component subcarriers: 64, 32, 32, 16, 16, 16, 8, 8, 4, 4.

Typically, the partition of the set of subcarriers into subchannels will be semi-static. It might be reconfigured, for example, on a seasonal basis or as dictated by physical changes to the network.

One advantage of such a scheme for varying the widths of subchannels is that it reduces signaling overhead. That is, the network can respond to a user request for more than one conventional subchannel by simply allocating one relatively wide subchannel, without the need to negotiate multiple channel assignments. As a consequence, overhead is reduced both in subchannel requests and in subchannel grants.

Transmission in MC-CDMA field 50 takes place on at least some of the subcarriers. However, the pertinent subcarriers are not grouped into separate subchannels for the purpose of such transmission. Instead, all users transmit on all such subchannels, but each user modulates its transmission onto one or more individually assigned spreading codes.

MC-CDMA transmission is especially advantageous for users near the cell edge, because users at the cell edge can typically only signal at low spectral efficiency values for which the benefit of orthogonalizing the users is small. As a consequence, the additional overhead of signaling a request for a subchannel and a grant of a subchannel is not warranted.

Each currently active user transmits an MC-CDMA pilot signal in each slot, regardless of whether data is being transmitted in that slot. A user is "active" if it is in an active MAC (medium access control) protocol state. The pilot signals are used on a slot-by-slot basis for transmission power control of the users. Preferably, fast power control is used.

Each pilot signal is transmitted as a sequence distributed over both field 20 and field 40. Separation of the pilot sequence into two fields (i.e., fields 20 and 40) is helpful because interpolating the channel estimates between the two fields helps to eliminate undesired Doppler-related error.

Because the pilot signals are in MC-CDMA format, there is no need for the network to allocate specific subcarriers for pilot transmission. This is advantageous because it facilitates fast power control, which is important for determining data rates and also for beam forming when multiple antennas are available at the base station.

Additional pilot tones may be defined in each subchannel for estimation of the signal-to-interference ratio (SIR).

Each user autonomously sets its transmit power and transmit rate, using information provided by the base station in the form of pilot power control (preferably fast power control) and the traffic-to-pilot ratio (T2P). Power control and T2P algorithms useful in this regard are similar to the corresponding algorithms described, for example, in pertinent CDMA standards.

According to an exemplary procedure for distributed allocation of OFDMA subchannels, the base station sends an indication, e.g. by broadcasting a single bit for each subchannel, of whether or not each subchannel is currently occupied. Each user monitors this broadcast before selecting a subchannel to be requested or on which to make a transmission.

The user chooses a subchannel, at least in part, according to available power. Roughly speaking, with higher power, a wider subchannel can be used while maintaining a given received power spectral density. Additionally, the user may choose the subchannel, in part, according to a priority ordering that the user has imposed on the subchannels. For example, users experiencing favorable radiofrequency propagation conditions may choose an ordering that places the wider subchannels first. In at least some cases, it will be advantageous for users experiencing similar propagation conditions to choose different subchannels from among a group of subchannels of similar widths. Such an approach will tend to maximize orthogonality among such users.

A number K is predetermined. If the last K indicator signals from the base station indicate that a given subchannel is empty, the user may begin transmitting on that subchannel. If no empty subchannel is available, the user may bid for an appropriate subchannel. Bidding takes place on a special channel provided for that purpose, referred to as the "contention channel." An exemplary bidding procedure is described below. The base station broadcasts the MAC-ID of each user that has won a bid.

As noted, each user autonomously determines its transmit rate on its selected subchannel. The rate determination is based on an estimate of the SINR (signal to interference and noise ratio) over that subchannel. The SINR is estimated, e.g., from the pilot SIR, the T2P, and a T2P multiplier. Each subchannel may have an individually assigned T2P multiplier. The T2P multiplier makes it possible to adjust transmission power according to the width of the subchannel.

According to our communication method in one embodiment, the user obtains the necessary resources for data transmission by executing a sequence of steps that include those listed below, which we refer to as the Distributed Resource Allocation (DRA) Procedure for Users. In at least some networks, the DRA Procedure could be executed once per slot for each service flow. Thus, given the timeslot structure of FIG. 1, the DRA Procedure could be executed twice per timeslot, and thus could make it possible for data to be transmitted in both the OFDMA field and the MC-CDMA field of at least some timeslots.

The orthogonality properties of OFDMA subchannels confer certain benefits for system performance which are most evident for high SMIR and high bit rate. For low bit rate, on the other hand, CDMA is generally more advantageous because it is more flexible and robust, and tends to perform approximately as well as OFDMA. Therefore, we have designed the DRA Procedure to favor OFDMA transmission when the user can achieve high spectral efficiency.

As a counterpart to the DRA Procedure for Users, the base station executes a sequence of steps including those that we refer to as the DRA Procedure for Base Station. Those steps are also listed below.

Distributed Resource Allocation Procedure for Users (1) Update the pilot power. For the OFDMA and MC-CDMA data fields, update the T2P bucket level.

(2) Estimate the required transmission rate $TR_{req}$. This estimate is based on the current backlog of packets queued for the user, urgency of the queued traffic, and the value of a parameter referred to here as the "transmission threshold ($T_{Tx}$)." "Urgency" may be measured, for example, by how long a packet has been waiting in the queu relative to a target latency value. The transmission threshold is, in effect, a weight which is used for avoiding excessive contention for resources. The transmission threshold may be a function of queue length, or of any other property or combination of properties related to traffic statistics such as traffic demand for an individual user. The transmission threshold is further discussed below.

(3) Determine a TxT2P (i.e., a transmission T2P) and a corresponding effective transmission rate ($TR_{eff}$) for the MC-CDMA field of the timeslot. If $TR_{eff} > TR_{req}$, transmit in the MC-CDMA field. Otherwise, go to the next step. The TxT2P is based on the T2P bucket level and on the available transmit power. The effective transmission rate is the rate at which data is being effectively transmitted using the MC-CDMA field only.

(4) If the network provides subchannels having different widths, determine the range of subchannel widths in which to make the current transmission. This determination is based on the T2P bucket level, the available transmit power, and the required transmission rate. Each user may have an individual priority ordering of subchannels, arranged to avoid collisions when two users request a subchannel of the same width at the same time. Priority orderings may also extend across subchannel widths. For example, a user experiencing favorable radio propagation conditions might prefer a wider subchannel over a narrower subchannel.

(5) If the signal from the base station indicates that an appropriate subchannel has been empty for the last K slots, grab that subchannel and transmit on it. Otherwise, go to the next step. If several subchannels are empty, grab a subchannel in accordance with the priority ordering described above.

(6) If the transmission threshold exceeds the advertised transmission threshold, then on the reverse link contention channel, transmit the transmission threshold and the required subchannel width to the base station. Otherwise, do not transmit. The advertised transmission threshold ($T_{TxA}$) is broadcast by the base station. In our example, the advertised transmission threshold is the most recent transmission threshold, reported by a user, that resulted in assignment of a subchannel to that user. By conditioning the user's transmission in this step on $T_{Tx} > T_{TxA}$, we reduce the amount of contention on the contention channel, and we regulate requests for resources. In some cases, $T_{TxA}$ may occasionally be too high, and subchannel requests will consequently be suppressed. In that event, the base station may reduce $T_{TxA}$ in stages by taking successive submultiples of it until an appropriate rate of channel requests is resumed. One way for the base station to indicate that a given subchannel is empty is to set $T_{TxA}$ for that subchannel to zero.

(7) After transmitting on the contention channel, wait for the base station to provide a grant of a subchannel, and then transmit on the granted subchannel. If the user is currently transmitting on a subchannel and needs to continue, it sends the new transmission threshold and request to the base station without contention. We refer to such an operation as "piggyback of future requests."

(8) Update the transmission threshold, the transmit pilot power, the T2P bucket levels, the urgency, and other pertinent variables periodically, as necessary in view of new packet arrivals, transmitted rate, and received reverse activity (RAB) bits.

Distributed Resource Allocation Procedure for Base Station (1) Demodulate the signals received on the contention channel, and from them determine the various subchannel widths that have been requested, and determine the various transmission thresholds.

(2) Assign subchannels to the requesting users, beginning with the highest transmission thresholds that occur in the queue of requests and proceeding in decreasing order of the transmission thresholds. In any case in which the requested subchannel is not available to fill a request, assign a subchannel with less than the requested width.

(3) Broadcast the MAC-ID of the user that succeeded in getting a subchannel assignment. Stagger the subchannel assignments, such that the assignment and the broadcast take place, e.g., once per timeslot. Typically, once a subchannel has been assigned, the assignment will persist for a certain number of subframes, each spanning several timeslots.

(4) In a broadcast, reflect back the most recent transmission threshold reported to the base station that caused a subchannel to be assigned. This step may be performed, for example, once per timeslot.

Table 1, below, provides a partial listing of the overhead signals required to implement the DRA Procedures for the user and the base station, in an exemplary embodiment.

TABLE 1

Summary of Overhead Signaling

| Signal Type | Comment |
|---|---|
| REVERSE LINK | |
| Contention Channel | For users to send transmission thresholds |
| | For users to request subchannels of specified widths |
| Piggyback of Future Requests | For contention-free transmission of subchannel request and transmission threshold |
| Reverse Rate Indicator | For both OFDMA subchannels and MC-CDMA transmission |
| Pilot Transmission | |
| FORWARD LINK | |
| Grant Channel | For base station to send MAC-ID for assignment of subchannels and thresholds |
| | Base station indicates a subchannel is empty by setting its threshold to zero |
| Reverse Pilot Power Control | |
| RAB | For MC-CDMA and OFDMA |

What is claimed is:

1. A method for communication over a reverse channel of a wireless network, comprising:
    dividing a transmission time slot into a plurality of portions, said portions including:
    at least two separated portions established for transmission of an MC-CDMA pilot signal;
    a portion established for transmission of an OFDMA data signal, the OFDMA data signal portion separating the at least two MC-CDMA pilot signal portions;
    wherein the OFDMA data signal portion is arranged to provide OFDMA subchannels of varying widths.

2. The method of claim 1 further comprising:
    an additional portion established for transmission of an MC-CDMA data signal.

3. The method of claim 2, further comprising choosing whether to transmit an MC-CDMA data signal.

4. The method of claim 3, wherein the choosing step comprises estimating a required transmission rate based at least in part on traffic statistics, and choosing to transmit the MC-CDMA data signal only if the required transmission rate is less than a threshold.

5. A method for communication over a reverse channel of a wireless network, comprising:
    receiving a signal over the reverse link transmitted using a transmission time slot divided into a plurality of portions, the portions including:

at least two separated portions established for transmission of an MC-CDMA pilot signal;

a portion established for transmission of an OFDMA data signal, the OFDMA data signal portion separating the at least two MC-CDMA pilot signal portions;

wherein the OFDMA data signal portion is arranged to provide OFDMA subchannels of varying widths.

6. The method of claim 5 wherein the transmission time slot further includes an additional portion established for transmission of an MC-CDMA data signal.

* * * * *